United States Patent [19]
Vitito

[11] Patent Number: 5,775,762
[45] Date of Patent: Jul. 7, 1998

[54] OVERHEAD CONSOLE HAVING FLIP-DOWN MONITOR

[76] Inventor: Christopher J. Vitito, 1618 Sherwood Lakes Blvd., Lakeland, Fla. 33809

[21] Appl. No.: 807,366

[22] Filed: Feb. 27, 1997

[51] Int. Cl.[6] .................................................... B60R 5/00
[52] U.S. Cl. ..................... 296/37.7; 296/37.8; 224/929; 224/539
[58] Field of Search ........................... 296/37.7, 37.8; 224/539, 929

[56] References Cited

U.S. PATENT DOCUMENTS

| | | | |
|---|---|---|---|
| D. 246,037 | 10/1977 | Kelly | D12/155 |
| D. 247,234 | 2/1978 | Stewart | D12/16 |
| D. 260,507 | 9/1981 | Kosugi et al. | D12/16 |
| D. 280,312 | 8/1985 | Simeri et al. | D12/155 |
| D. 282,251 | 1/1986 | Isham et al. | D12/155 |
| D. 282,733 | 2/1986 | Giavazzi et al. | D12/195 |
| D. 285,684 | 9/1986 | Akita et al. | D14/80 |
| D. 320,587 | 10/1991 | Kapp et al. | D12/155 |
| D. 340,016 | 10/1993 | Falcoff | D12/155 |
| 3,284,041 | 11/1966 | Tjaden | 248/311 |
| 3,773,378 | 11/1973 | Lewis | 296/37 R |
| 4,101,159 | 7/1978 | Stewart | 296/37.7 |
| 4,241,870 | 12/1980 | Marcus | 296/37.7 |
| 4,818,010 | 4/1989 | Dillon | 296/37.7 |
| 4,824,159 | 4/1989 | Fluharty et al. | 296/37.7 |
| 4,867,498 | 9/1989 | Delphia et al. | 298/37.7 |
| 5,040,990 | 8/1991 | Suman et al. | 296/37.7 X |
| 5,305,970 | 4/1994 | Young et al. | 296/37.7 |
| 5,338,081 | 8/1994 | Young et al. | 296/37.8 X |
| 5,397,160 | 3/1995 | Landry | 296/37.8 |
| 5,469,298 | 11/1995 | Suman et al. | 296/37.8 X |
| 5,636,891 | 6/1997 | Van Order et al. | 296/37.7 |

FOREIGN PATENT DOCUMENTS

| | | | |
|---|---|---|---|
| 361077542 | 4/1986 | Japan | 224/929 |
| 361282139 | 12/1986 | Japan | 224/929 |
| 1-300775 | 12/1989 | Japan | H04N 5/64 |
| 2-31577 | 2/1990 | Japan | H04N 5/64 |
| 2-149083 | 6/1990 | Japan | H04N 5/64 |
| 3-10476 | 1/1991 | Japan | H04N 5/64 |
| 404063739 | 2/1992 | Japan | 296/37.8 |
| 405024486 | 2/1993 | Japan | 224/539 |
| 405131879 | 5/1993 | Japan | 224/929 |
| 405185878 | 7/1993 | Japan | 224/929 |

*Primary Examiner*—Joseph D. Pape
*Attorney, Agent, or Firm*—Aquilino & Welsh

[57] ABSTRACT

An overhead console for a motor vehicle, boat, or aircraft, is disclosed. The console includes an elongated console housing having a leading end and a trailing end, a monitor mounted in the leading end of the console housing, and a compartment for storing a source of video signals.

18 Claims, 4 Drawing Sheets

OVERHEAD CONSOLE HAVING FLIP-DOWN MONITOR

BACKGROUND OF THE INVENTION

1. Field of the Invention

The present invention relates to overhead consoles typically found in vans and similar motor vehicles, as well as boats, airplanes and other vehicles. More particularly, the invention relates to a console having a monitor at its leading end and a compartment for supporting a source of video signals at its trailing end.

2. Description of the Prior Art

Overhead consoles for vans and similar vehicles are well known. They are generally of an elongated construction and are mounted coincident with the longitudinal axis of symmetry of the vehicle. Typically, they include storage space and other controls. For example, consoles may include controls for an air conditioner or a radio. Overhead consoles also have found utility in boats and airplanes.

Many people equip their recreational vehicles with television sets. However, the installation of such television systems is often very expensive, requiring substantial remodeling of the vehicle to provide a system easily viewable by passengers, without obstructing the driver's view of the road.

In addition, when a vehicle not equipped with a satellite dish is far from a video transmitter, the video reception is very poor, if the vehicle is capable of receiving any video signal at all. As a result, the use of televisions within vans and other vehicles is of only limited help in providing entertainment while passengers are traveling long distances within the vehicle.

A need, therefore, exists for an overhead console having a readily accessible television monitor, or other monitor means, that may be viewed by passengers within the motor vehicle, boat, or aircraft, without obstructing the driver's view or the pilot's view. In addition, a need exists for a console including means for delivering video signals to the monitor so that when a vehicle equipped with the console is isolated from a broadcast transmitter, the quality of the video signals displayed on the monitor means is not adversely affected. The present invention provides such a console.

SUMMARY OF THE INVENTION

It is, therefore, an object of the present invention to provide an overhead console for a motor vehicle, boat, or aircraft. The console includes an elongated console housing having a leading end and a trailing end, a monitor mounted in the leading end of the console housing, and a compartment for storing a source of video signals.

It is also an object of the present invention to provide an overhead console wherein the leading end of the console housing is bulbous with respect to a central section located between the leading end and the trailing end.

It is another object of the present invention to provide an overhead console wherein the trailing end of the console housing is bulbous with respect to a central section located between the leading end and the trailing end, and the compartment is located at the trailing end of the console housing.

It is a further object of the present invention to provide an overhead console wherein the monitor is pivotally mounted on the console housing.

It is also an object of the present invention to provide an overhead console including hinge means for pivotally mounting the monitor to the leading end of the console housing, wherein the monitor has a storage position where it is fully received within the leading end of the console housing and the monitor has a deployed position where it is pivoted from it storage position.

It is another object of the present invention to provide an overhead console wherein the console housing includes a monitor recess formed in a bottom wall of the console housing and the monitor recess is sized and shaped to accommodate the monitor such that the monitor is flush with the bottom wall of the console housing when the monitor is in its storage position.

It is a further object of the present invention to provide an overhead console wherein the monitor is pivotally mounted to rotate toward the leading end of the console housing when the monitor rotates from its deployed position to its storage position.

It is also an object of the present invention to provide an overhead console wherein the hinge means are frictional hinges so that the monitor is frictionally supported in any preselected rotational position.

It is another object of the present invention to provide an overhead console including an opening formed in a leading side of the compartment of the console housing to permit access to a control panel of the source of video signals.

It is a further object of the present invention to provide an overhead console including a source of video signals positioned within the compartment.

It is also an object of the present invention to provide an overhead console wherein the source of video signals is a video cassette recorder.

It is another object of the present invention to provide an overhead console including electrically conductive means for coupling the source of video signals to the monitor.

It is a further object of the present invention to provide an overhead console including a control panel mounted on the console housing.

It is also an object of the present invention to provide an overhead console wherein the control panel is mounted on a central section of the console housing between the leading end of the console housing and the trailing end of the console housing It is another object of the present invention to provide an overhead console wherein the monitor is an liquid crystal display.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
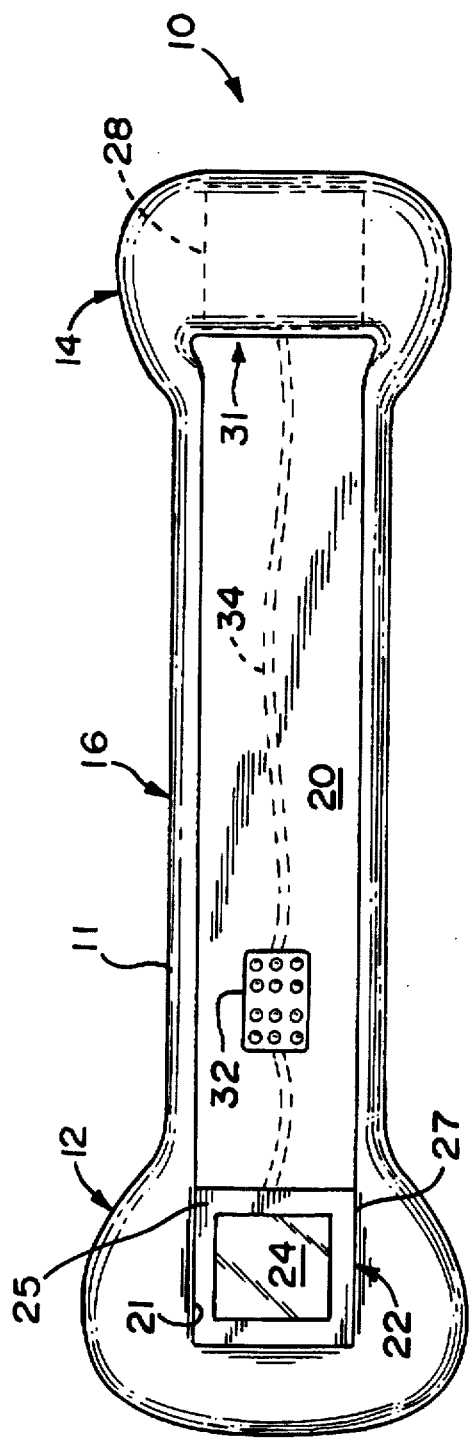
FIG. 1 is plan view of an illustrative embodiment of the invention when the monitor is in its storage position.

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Referring to FIGS. 1–4, a console 10 embodying the present invention is disclosed. The console 10 includes an elongated, hollow console housing 11 having a leading end 12, a trailing end 14, and a central section 16. In accordance with the preferred embodiment of the present console 10, the leading end 12 and the trailing end 14 are bulbous relative to the central section 16. While the present console 10 is substantially "dog bone" shaped, the console 10 may take on a variety of shapes without departing from the spirit of the present invention.

The console housing 11 is a substantially hollow structure. The console housing 11 includes a continuous, generally vertical sidewall 18 defining the outer perimeter of the console housing 11, and a horizontal bottom wall 20. The console housing 11 is preferably molded plastic, although other materials could be used without departing from the spirit of the present invention.

A television monitor 22 is pivotally coupled to the console 11 at the leading end 12 of the console housing 11 by hinges 19. The monitor 22 is stored within a monitor recess 21 corresponding to the size and shape of the monitor 22. The monitor recess 21 is formed in the leading end 12 of the console housing 11 to flushly accommodate the monitor 22 when the monitor 22 is in a folded, or storage, position. When the monitor is in its folded position as shown in FIG. 1, the monitor 22 is retained within the monitor recess 21 by suitable detente means (not shown). For example, the detente means may be similar to those used in laptop computers to hold the monitor in a closed position. The monitor is preferably a liquid crystal display (LCD) monitor commonly found in laptop computers and portable televisions. However, a variety of monitors could be employed without departing from the spirit of the present invention.

Figure 2:
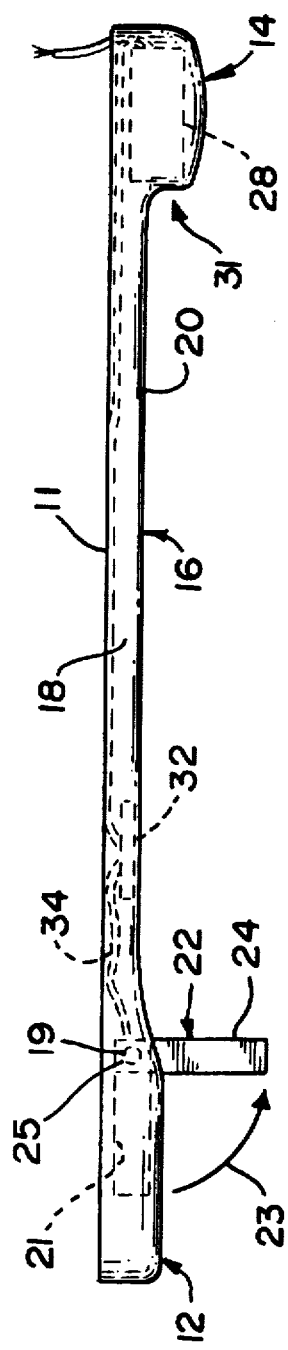
FIG. 2 is a side elevation view of the embodiment of FIG. 1 when the monitor is in its unfolded or deployed position.
Figure 3:
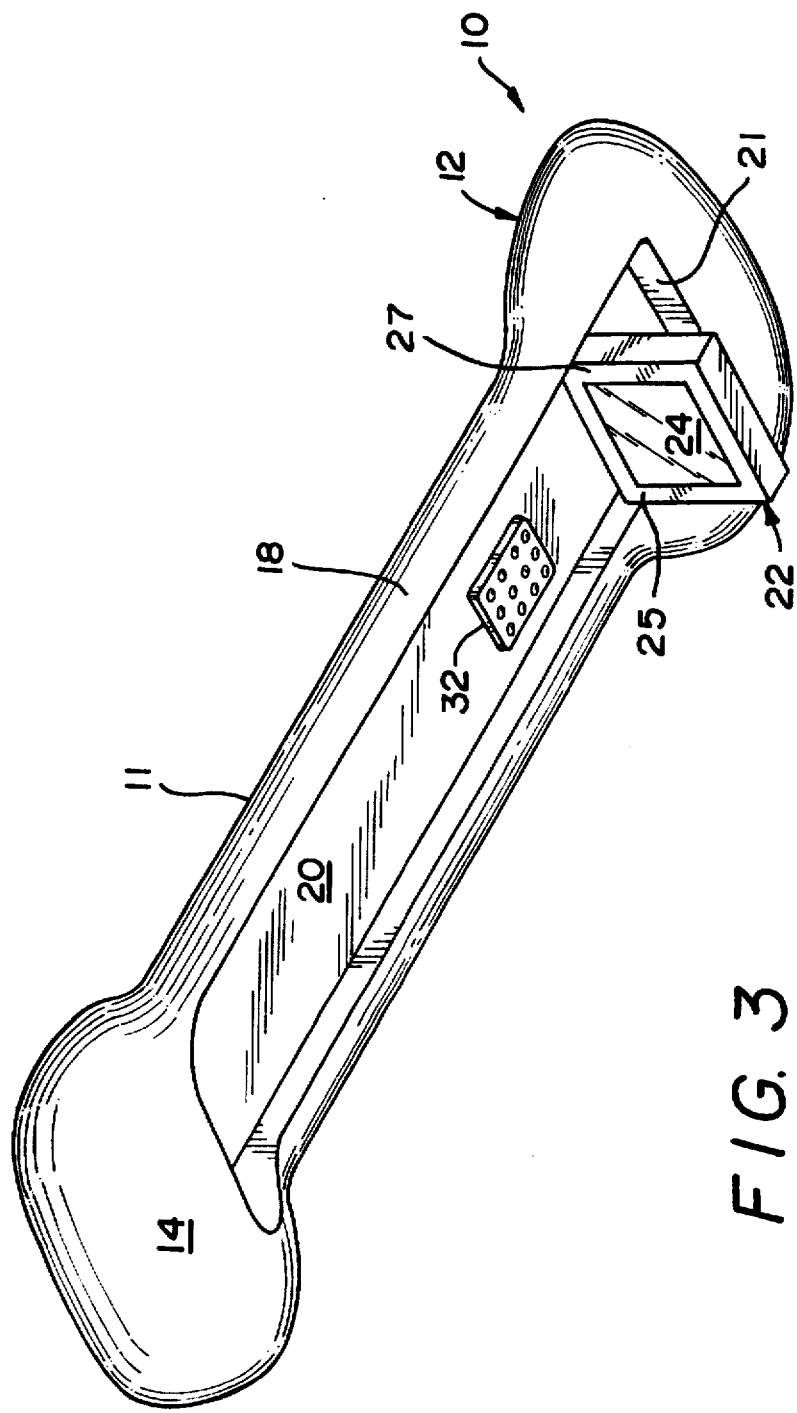
FIG. 3 is a perspective view looking toward the leading end of the novel console when the monitor is in its unfolded or deployed position.
Figure 4:
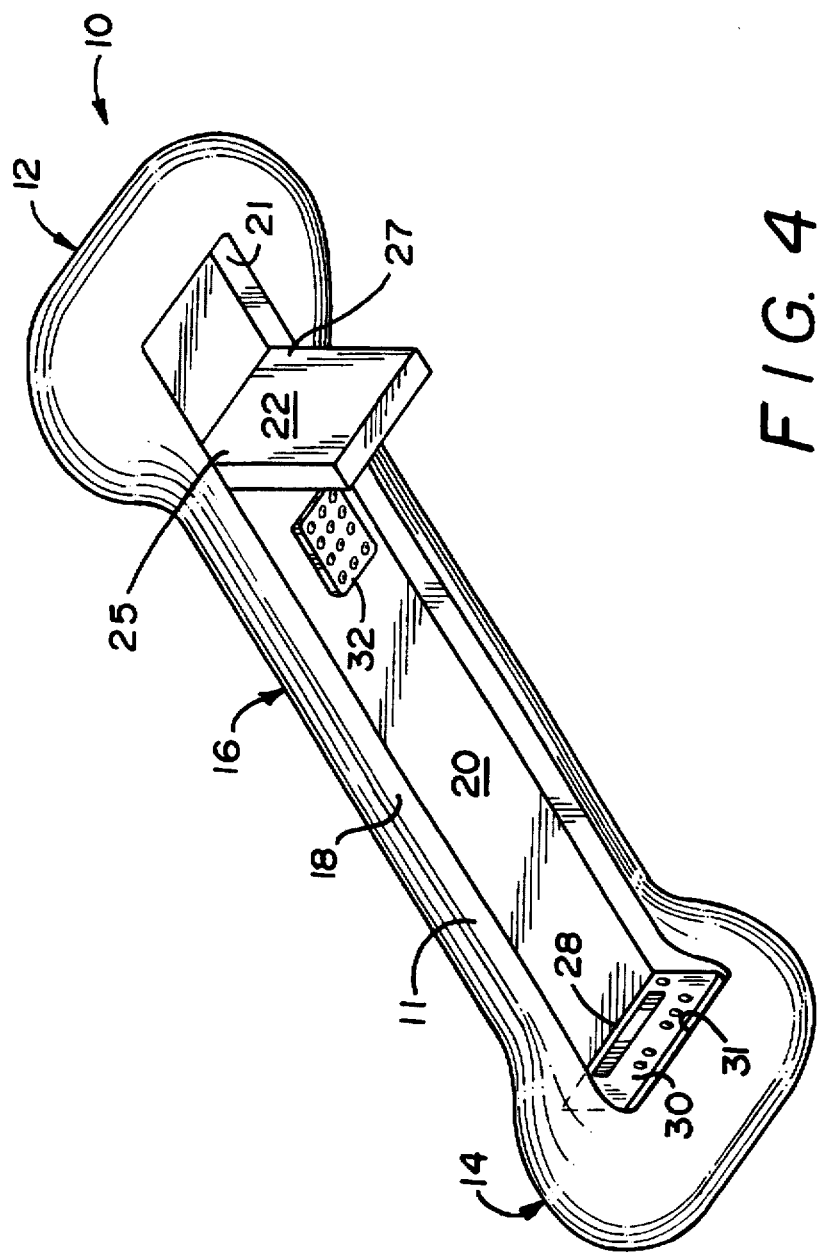
FIG. 4 is a perspective view looking toward the trailing end of the novel console when the monitor is in its unfolded or deployed position.

Specifically, and with reference to FIG. 1, the monitor 22 has a first, or storage, position, in which the screen 24 is flush with bottom wall 20 of the console housing. In this position, the monitor 22 is completely out of the way and may not be viewed by passengers in the vehicle. As shown in FIG. 2, the monitor 22 also has a second, or deployed, position. When the monitor 22 is in its second position, the monitor is disposed at a substantially ninety degree (90°) angle relative to its stored first position and may be viewed by passengers in the vehicle. However, the monitor 22 may be positioned at a variety of angular positions when in its deployed second position, without departing from the spirit of the present invention. The size of the monitor 22 is such that it does not interfere with the driver's or pilot's line of sight through the rear view mirror of the motor vehicle, boat, or aircraft.

The monitor 22 is pivotally mounted within the console housing 11. Specifically, the monitor 22 is pivotally hinged to the console housing 11 at its upper left corner 25 and its upper right corner 27. As a result, the monitor 22 is rotated rearwardly, that is, toward the trailing end 14 of the console 10, when the monitor is moved from its first position to its second position. Similarly, the hinge orientation permits the monitor 22 to swing forward, that is, toward the leading end 12 of the console housing 11 if the monitor 22 is accidentally struck by a passenger or other object moving toward the leading end 12 of the console housing 11. In this way the safety of the present console 10 is improved.

The double-headed directional arrow 23 shown in FIG. 2 indicates both the downward and upward folding of the monitor 22 about its hinges, that is, the monitor is rotatable about a horizontal axis. The hinges 19 are frictional hinges and maintain the monitor 22 in any preselected rotational position in which the monitor is places. As a result, if lighting conditions are such that passengers can see the screen 24 best when it is tilted at a seventy degree angle relative to its storage, horizontal position, the frictional hinges will hold the monitor in such a position.

The trailing end 14 of the console housing 11 is provided with a compartment 29 sized and shaped to receive a source of video signals, for example, a standard video cassette recorder 28. When fully installed, the video cassette recorder 28, or other suitable source of video signals, is housed in the compartment 29 located in the trailing end 14 of the console housing 11. The bulbous trailing end 14 of the console housing 11 is such that the central section 16 of the console housing 11 does not obstruct the opening 31 at the leading side of the compartment 29 at the trailing end 14 of the console housing 11. Thus, the control panel 30 of the video cassette recorder 28 is exposed allowing passengers to control the video cassette recorder in a conventional manner. For example, video cassettes may be introduced into and removed from the video cassette recorder 28 in a normal manner and passengers may operate the video cassette recorder 28 by manipulating the controls on said control panel 30.

A second control panel 32 is provided on the console 10. Specifically, the control panel 32 is positioned on the central section 16 of the console housing 11, within easy reach of the passengers within the vehicle. The second control panel 32 includes a variety of buttons similar to those found on a conventional remote control for controlling a variety of functions of the monitor 22 and the video cassette recorder 28.

The length of central section 16 is such that the video cassette player or recorder 28 is near the rear of the passenger compartment of the vehicle. Unfortunately, the controls on control panel 30 may not be conveniently within reach of passengers in the middle row of seats in a van, or other vehicle, having three or more rows of seats. The second control panel 32 for controlling operation of the video cassette recorder 28 is, therefore, preferably located toward the leading end 12 of the console housing 11 for the convenience of such passengers. Any type or style of control means may be employed and the control means may be located at a variety of positions along the central section 16, without departing from the spirit of the present invention.

A hinged door (not shown), or other suitable closure means may be provided to selectively close the opening 31 in the compartment 29 so that the video cassette recorder 28 is not visible to thieves when the vehicle is not occupied.

Electrically conductive means such as insulated electrical wires 34 provide electrical communication between the source of video signals 28, that is, the video cassette recorder, and the monitor 22. The wires 34 are housed within the underside of the console 10 and extend along the elongated central section 16 of the console housing 11. The console housing 11 is preferably constructed from an opaque material so that said wires are not visible. The second control panel 32 is also in electrical communication with the wires as indicated in FIGS. 1 and 2.

Figure 5:
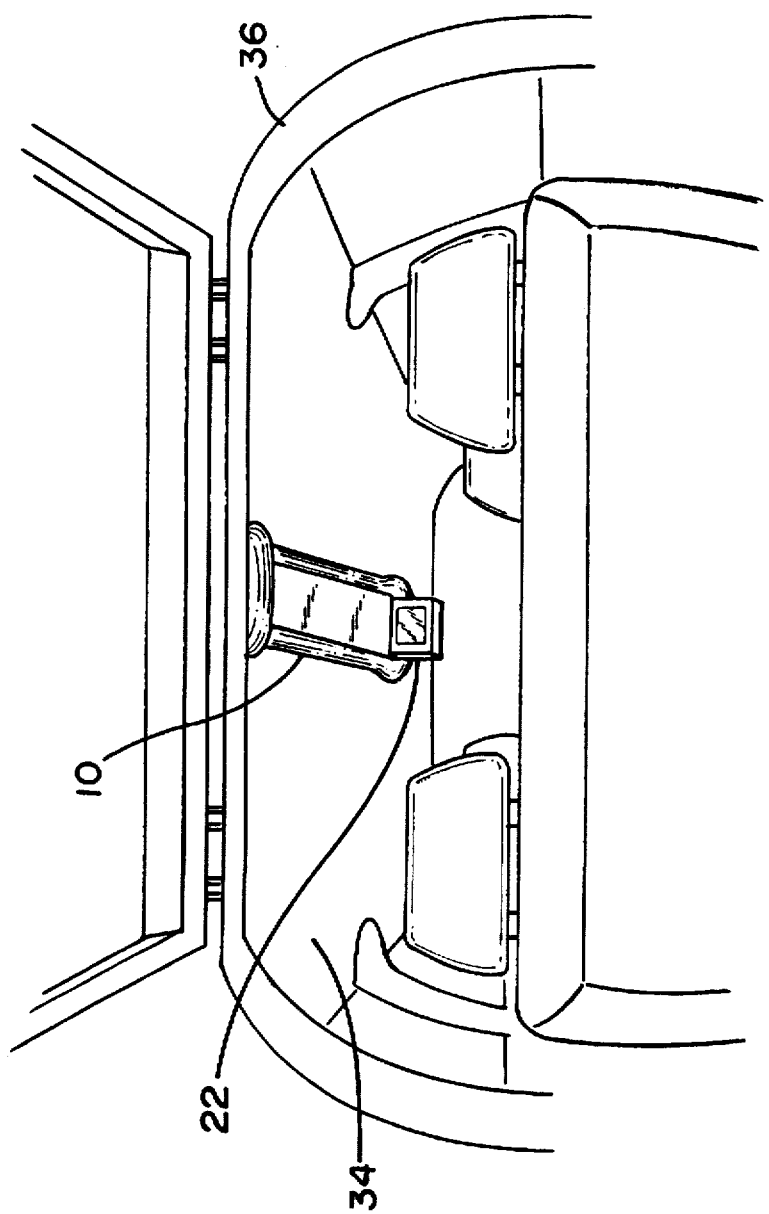
FIG. 5 is a perspective view showing the novel console mounted within a motor vehicle.

As shown in FIG. 5, when the console 10 is properly installed on the interior ceiling 34 of a vehicle 36, the monitor 22 is positioned so that the vehicle's driver cannot view any image that might appear on screen 24. The console 10 is easy to install and has an attractive appearance that enhances the appearance of the passenger compartment within which it is mounted. Briefly, a portion of the interior lining of the ceiling is removed to accommodate the console, and the console is screwed to the central rib of the vehicle. As one of ordinary skill in the art will certainly appreciate, the installation procedure may be readily adapted to suit a variety of motor vehicles, boats, and planes.

Having a low profile, the present console takes up little space. By providing a video cassette recorder near the rear of the passenger compartment, and by providing conveniently located controls, passengers are able to enjoy whatever video presentations they care to watch during trips, while not obstructing the driver's or pilot's view.

While the preferred embodiment of the present invention is disclosed above, a variety of modifications may be made without departing from the spirit of the present invention. For example, the video cassette recorder or player may be replaced with a game console (for example, NINTENDO™, SEGA™, etc.), an enhanced video reception unit, or video disc player.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. An overhead console for a motor vehicle, boat, or aircraft, comprising:

an elongated console housing having a leading end and a trailing end, the elongated console being shaped for attachment to an interior ceiling of a vehicle;

a television monitor mounted in the leading end of the console housing; and a compartment for storing a source of video signals formed in the trailing end of the console housing, and conductive means associated with the compartment for connecting the television monitor to the compartment to provide ready attachment of the source of video signals to the television monitor and transmission of video signals between the source of video signals and the television monitor.

2. The overhead console according to claim 1, wherein the leading end of the console housing is bulbous with respect to a central section located between the leading end and the trailing end.

3. The overhead console according to claim 2, wherein the trailing end of the console housing is bulbous with respect to a central section located between the leading end and the trailing end, and the compartment is located at the trailing end of the console housing.

4. The overhead console according to claim 1, wherein the trailing end of the console housing is bulbous with respect to the central section, and the compartment is located at the trailing end of the console housing.

5. The overhead console according to claim 1, wherein the monitor is pivotally mounted on the console housing.

6. The overhead console according to claim 2, further including hinge means for pivotally mounting the monitor to the leading end of the console housing, the monitor having a storage position where it is fully received within the leading end of the console housing and the monitor having a deployed position where the monitor is pivoted from a storage position.

7. The overhead console according to claim 6, wherein the console housing includes a monitor recess formed in a bottom wall of the console housing, the monitor recess being sized and shaped to accommodate the television monitor, wherein the television monitor is flush with the bottom wall of the console housing when the television monitor is in the storage position.

8. The overhead console according to claim 7, wherein the television monitor is pivotally mounted to rotate toward the leading end of the console housing when the television monitor rotates from the deployed position to the storage position.

9. The overhead console according to claim 6, wherein the hinge means are frictional hinges so that the television monitor is frictionally supported in any preselected rotational position.

10. The overhead console according to claim 1, further including an opening formed in a leading side of the compartment of the console housing.

11. The overhead console according to claim 1, further including a source of video signals positioned within the compartment.

12. The overhead console according to claim 11, wherein the source of video signals is a video cassette recorder.

13. The overhead console according to claim 11, wherein the conductive means are electrically conductive means for coupling the source of video signals to the television monitor.

14. The overhead console according to claim 11, further including a control panel mounted on the console housing.

15. The overhead console according to claim 14, wherein the control panel is mounted on a central section of the console housing between the leading end of the console housing and the trailing end of the console housing.

16. The overhead console according to claim 1, wherein the television monitor is an liquid crystal display.

17. The overhead console according to claim 1, further including a control panel mounted on the console housing.

18. The overhead console according to claim 17, wherein the control panel is mounted on a central section of the console housing between the leading end of the console housing and the trailing end of the console housing.

* * * * *